(12) United States Patent
Xue et al.

(10) Patent No.: US 12,313,440 B2
(45) Date of Patent: May 27, 2025

(54) HIGH-PRECISION AUTOMATIC WEIGHING DEVICE FOR POWDER SAMPLES

(71) Applicant: Institute of Geology and Geophysics, Chinese Academy of Sciences, Beijing (CN)

(72) Inventors: Dingshuai Xue, Beijing (CN); Danping Zhang, Beijing (CN); Yanhong Liu, Beijing (CN); Shun Guo, Beijing (CN); Xiangli Wang, Beijing (CN); Bo Wan, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/959,574

(22) Filed: Nov. 25, 2024

(65) Prior Publication Data

US 2025/0085157 A1    Mar. 13, 2025

(51) Int. Cl.
| | |
|---|---|
| *G01G 13/00* | (2006.01) |
| *B08B 3/02* | (2006.01) |
| *B08B 9/032* | (2006.01) |
| *G01B 21/22* | (2006.01) |
| *G01G 21/22* | (2006.01) |

(52) U.S. Cl.
CPC ............ *G01G 13/006* (2013.01); *B08B 3/02* (2013.01); *B08B 9/0321* (2013.01); *G01B 21/22* (2013.01); *B08B 2209/032* (2013.01)

(58) Field of Classification Search
CPC ... B08B 3/02; B08B 9/0321; B08B 2209/032; G01G 13/006; G01G 21/22; B25J 5/02; B25J 5/04
See application file for complete search history.

(56) References Cited

U.S. PATENT DOCUMENTS

| | | | | |
|---|---|---|---|---|
| 3,760,956 | A  * | 9/1973 | Burch | .................... B25J 9/1035 |
| | | | | 901/17 |
| 6,732,750 | B2 * | 5/2004 | Cho | .................. H01L 21/67034 |
| | | | | 134/135 |
| 9,949,419 | B2 * | 4/2018 | Sano | ........................ B25J 9/026 |
| 10,549,420 | B2 * | 2/2020 | Bonora | ................ B25J 15/0052 |
| 11,885,822 | B2 * | 1/2024 | Collins | ............ G01N 35/00613 |

* cited by examiner

*Primary Examiner* — Randy W Gibson
(74) *Attorney, Agent, or Firm* — Addison D. Ault; IPGentleman Intellectual Property Services, LLC (57) ABSTRACT

The present disclosure relates to a high-precision automatic weighing device for powder samples, including a three-dimensional moving track and a working area, wherein the three-dimensional moving track includes a horizontal length track, a vertical track and a horizontal width track, the vertical track being slidingly connected to the horizontal length track, the horizontal width track being slidingly connected to the vertical track; the horizontal length track is arranged on one side of the working area, and a cleaning area, a sample storage area and a weighing area are provided in sequence along the horizontal length track within the working area; a series of slideways are connected to a mechanical claw for grabbing a sample tube in the sample storage area, a fine-tuning sample releasing mechanism to release samples in trace amounts, a sample head clamping part for mounting or dismounting of a sample head, and a sample loosening pestle.

9 Claims, 6 Drawing Sheets

HIGH-PRECISION AUTOMATIC WEIGHING DEVICE FOR POWDER SAMPLES

TECHNICAL FIELD

The present disclosure belongs to the technical field of sample weighing, and in particular relates to a high-precision automatic weighing device for powder samples.

BACKGROUND

Weight analysis is the benchmark of chemical analysis, and weighing is required in a large number of chemical analyses. In such experiments as geological analyses, whole-rock isotope analyses and ablative amount analyses, a large number of rock, soil and ore samples in different types need to be analyzed. Prior to chemical analysis of samples, quantitative weighing of samples is required in most analyses, and then samples are processed and analyzed, in order to calculate the percentage of a component or some components in the samples.

At present, among the devices used for weight analysis on the market, the devices capable of automatic weighing are mainly used for the same type of powder or glass bead-like samples, while as to the devices that can precisely weigh different powdered samples, the automation degree is not high due to a difficulty in switching between different samples. In addition, the weighing apparatus should be kept clean. If an apparatus needs to be frequently used during the weighing process, the apparatus needs to be cleaned to prevent contamination to subsequent samples. Due to the nature of the powdered samples themselves which are easily agglomerated, powdered samples are generally automatically weighed at a low precision. Geological samples are very diverse, and different samples are different in moisture absorption and viscosity, while geochemical analysis requires an extremely high weighing precision, for example, as to XRF analysis, the weighing precision of samples is required to be ±0.3 mg, and as to microelement analysis (ICP-MS), the weighing precision is required to be ±0.1 mg.

SUMMARY

Aiming at the above problem, the present disclosure provides a high-precision automatic weighing device for powder samples, including a three-dimensional moving track and a working area, where the three-dimensional moving track includes a horizontal length track, a vertical track and a horizontal width track, the vertical track being slidingly connected to the horizontal length track, the horizontal width track being slidingly connected to the vertical track, such that the horizontal width track moves along the vertical track, and the vertical track moves along the horizontal length track;

the horizontal length track is arranged at an edge of one side of the working area, and a cleaning area, a sample storage area and a weighing area are provided in sequence along the horizontal length track within the working area, and a liftable partition plate is provided between the cleaning area and the sample storage area, so as to avoid contamination to samples;

a first slideway and a second slideway are provided, wherein the first slideway is above the second slideway, facing the weighing area, of the horizontal width track, and a third slideway and a fourth slideway are provided, wherein the third slideway is above the fourth slideway on the other side of the horizontal width track, the first slideway extending to the other side of the horizontal width track and being located below the fourth slideway, the first slideway, the second slideway, the third slideway and the fourth slideway being all horizontal; and the first slideway is slidingly connected to a mechanical claw for grabbing a sample tube in the sample storage area, and the second slideway is slidingly connected to a fine-tuning sample releasing mechanism for tapping the sample tube to release samples in trace amounts, and the third slideway is slidingly connected to a sample head clamping part for finishing the mounting or dismounting of a sample head and the sample tube, and the fourth slideway is slidingly connected to a sample loosening pestle for crushing agglomerated samples inside the sample tube.

Optionally, the mechanical claw includes a supporting rod I and a gripper which is openable and closable, one end of the supporting rod I being slidingly connected to the first slideway, the other end being rotationally connected to a closed end of the gripper through an adapter member; and the gripper is circular, the gripper being composed of two semi-circular frames which are symmetrically arranged, and two corresponding ends on the same side of each of the two semicircular frames are connected in an articulated manner to form the closed end, and two corresponding ends on the other side can be opened and closed freely to form an opening and closing end; when a cylindrical sample tube needs to be grabbed, the opening and closing end of the gripper is open, and the gripper descends, such that a tube head of the sample tube penetrates through the inside of the gripper, and then the opening and closing end is closed, and the gripper is tightly wrapped on an outer wall of the sample tube.

Further optionally, a rotator and an angle sensor are provided at the position where the supporting rod I is connected to the adapter member, and the rotator can control rotation of the gripper, and the angle sensor can monitor in real time the rotation angle of the gripper, and further control the inclination angle of the sample tube.

Optionally, the sample head is conical and is small at the top and large at the bottom with an opening at the top for pouring out samples, and the bottom is vertical and an inner wall is provided with internal threads to adapt to external threads on an outer wall on the top of the sample tube, so as to facilitate threaded connection between the sample head and the sample tube; the sample head is hollow inside and is provided with continuous spiral textures protruding inwards on the inner wall, and a plurality of circles of spiral textures are spirally provided from top to bottom along a circumferential direction of the sample head, the spiral textures extending from the top opening of the sample head to the position above the bottom of the sample head, and the spiral textures are not connected to the above-mentioned internal threads.

Optionally, the sample head clamping part includes a rotating motor, a water baffling plate and a holder which are provided in sequence from top to bottom, where the rotating motor is slidingly connected to the third slideway through a sliding block, and a rotating shaft of the rotating motor penetrates through the water baffling plate and is connected to the holder, so as to drive the water baffling plate and the holder to rotate; and the water baffling plate can prevent the water used for cleaning the sample head from rushing to the rotating motor; and the holder is a retractable and liftable three-claw holder, belonging to the prior art; in terms of holding position, the holder includes two operating positions, where the first operating position is a clamping position, i.e., the three claws are all close to the circle center of the holder, and at this time, inner walls of the three claws can be tightly pressed against the outer side surface at the bottom of the sample head, so that the sample head is clamped; the second operating position is a relaxation position, i.e., the three claws are all far away from the circle center of the holder, and at this time, the three claws do not contact the sample head, so that the sample head is not clamped; the top of the three claws is articulated with a telescopic rod, which is capable of moving the three claws up and down.

Optionally, the cleaning area includes a sink, a waterproof wall, a sprinkler and at least two blow dryers, where the sink is configured to reserve water for cleaning the sample head and the sample loosening pestle, and the waterproof wall is arranged around the sink to prevent water sprayed onto the sample head or the sample loosening pestle by the sprinkler from splashing onto the outside of the sink;

the sprinkler is arranged inside the sink and is provided with a water pump at the bottom and a nozzle at the top, and the water pump feeds water in the sink into the sprinkler and then sprays water out of the nozzle; and the two blow dryers are symmetrically arranged on the outer side of the sink, and an air outlet is tilted upwards and aligned with the cleaned sample head and sample loosening pestle above to dry the sample head and the sample loosening pestle for use by the next sample tube.

Optionally, the fine-tuning sample releasing mechanism includes a supporting rod II, a balancing rod, an upward sample applicator and a downward sample applicator, where one end of the supporting rod II is slidingly connected to the second slideway, and the other end is connected to the middle of the balancing rod; the balancing rod is arranged horizontally, with one end being connected to a bottom of the upward sample applicator, while the other end being connected to the downward sample applicator through a fulcrum rod; the upward sample applicator and the fulcrum rod are both arranged vertically, the bottom of the fulcrum rod being connected to the balancing rod, the top being connected to the top of the downward sample applicator; and a retractable sample application head I is provided on the top of the upward sample applicator, and the sample application head I is configured to tap the middle and lower parts of the sample tube, so as to promote samples inside the sample tube to move outwards; a retractable sample application head II is provided on the bottom of the downward sample applicator, and the sample application head II is configured to tap the sample head, to promote samples in the sample head to move outwards.

Further optionally, the balancing rod is provided with scale lines on the upper or lower surface, the balancing rod being provided with a hollowed-out chute, the chute being parallel to the balancing rod, and the bottom of the upward sample applicator and the bottom of the fulcrum rod are both slidingly connected to the chute, such that the upward sample applicator and the downward sample applicator both move their positions along the balancing rod, to tap different positions of the sample tube and the sample head to control the fall off of powder samples.

Further optionally, the upward sample applicator and the downward sample applicator can move along the chute on the balancing rod under the control of an electromagnetic device, and the movement distance is observed by means of the scale lines, such that the upward sample applicator and the downward sample applicator can act on different positions on the sample tube; and under the control of the electromagnetic device, the upward sample applicator moves upwards at a constant force and frequency and taps the sample tube and then retracts and resets; and under the control of the electromagnetic device, the downward sample applicator moves downwards at a constant force and frequency and taps the sample head and then retracts and resets.

Optionally, the sample loosening pestle is telescopic, and the sample loosening pestle extends and retracts through electromagnetic control, such that the pestle head at the bottom can move up and down, and an electromagnetic controller corresponding to the top of the sample loosening pestle is slidingly connected to the fourth slideway through a sliding block, and the electromagnetic controller is in communication connection with the control device.

Reference numerals in the drawings: 1—working area, 2—horizontal length track, 3—vertical track, 4—horizontal width track, 5—cleaning area, 6—sample storage area, 7—weighing area, 8—partition plate, 9—first slideway, 10—second slideway, 11—third slideway, 12—fourth slideway, 13—mecahnical claw, 14—fine-tuning sample releasing mechanism, 15—sample head clamping part, 16—downward sample applicator, 17—sample tube, 18—supporting rod I, 19—gripper, 20—closed end, 21—opening and closing end, 22—adapter member, 23—telescopic segment, 24—fixed segment, 25—rotator, 26—angle sensor, 27—sample head, 28—chute, 29—rotating motor, 30—water baffling plate, 31—holder, 32—sink, 33—waterproof wall, 34—sprinkler, 35—blow dryer, 36—fulcrum rod, 37—balancing rod, 38—upward sample applicator.

DETAILED DESCRIPTION

Figure 1:
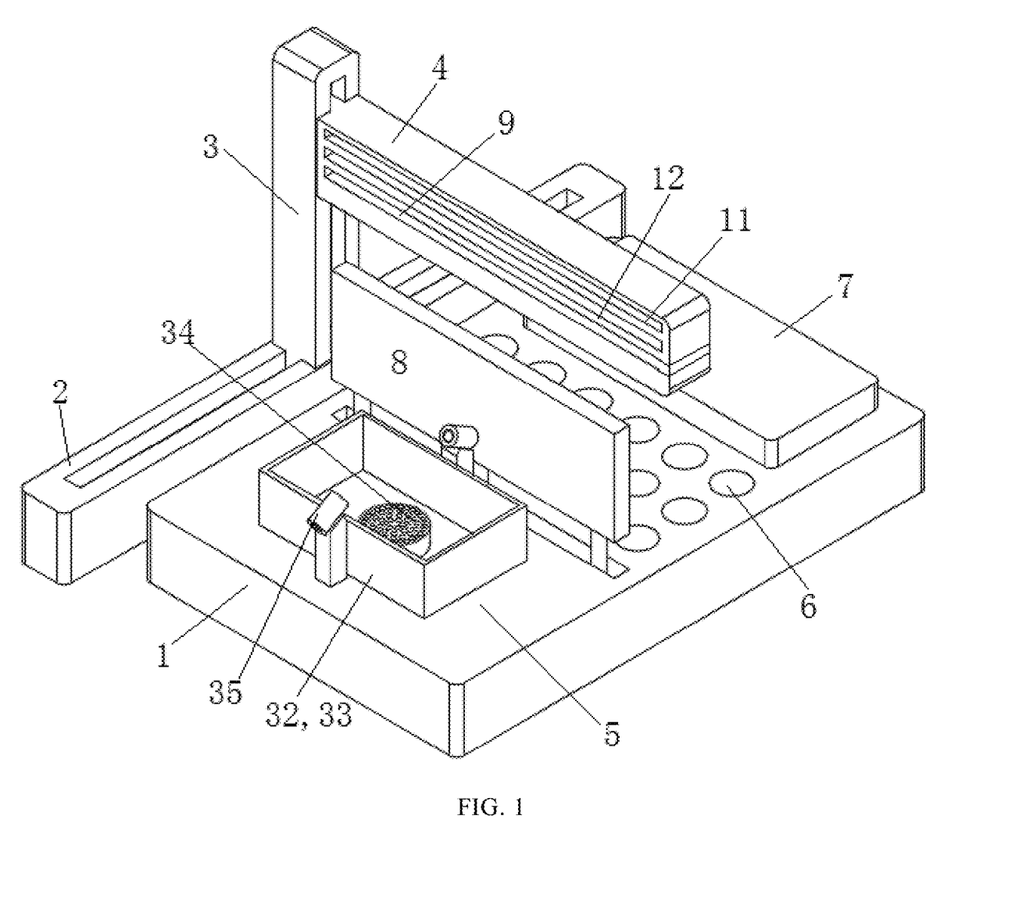
FIG. 1 is a structural schematic diagram (I) of the high-precision automatic weighing device for powder samples.
Figure 2:
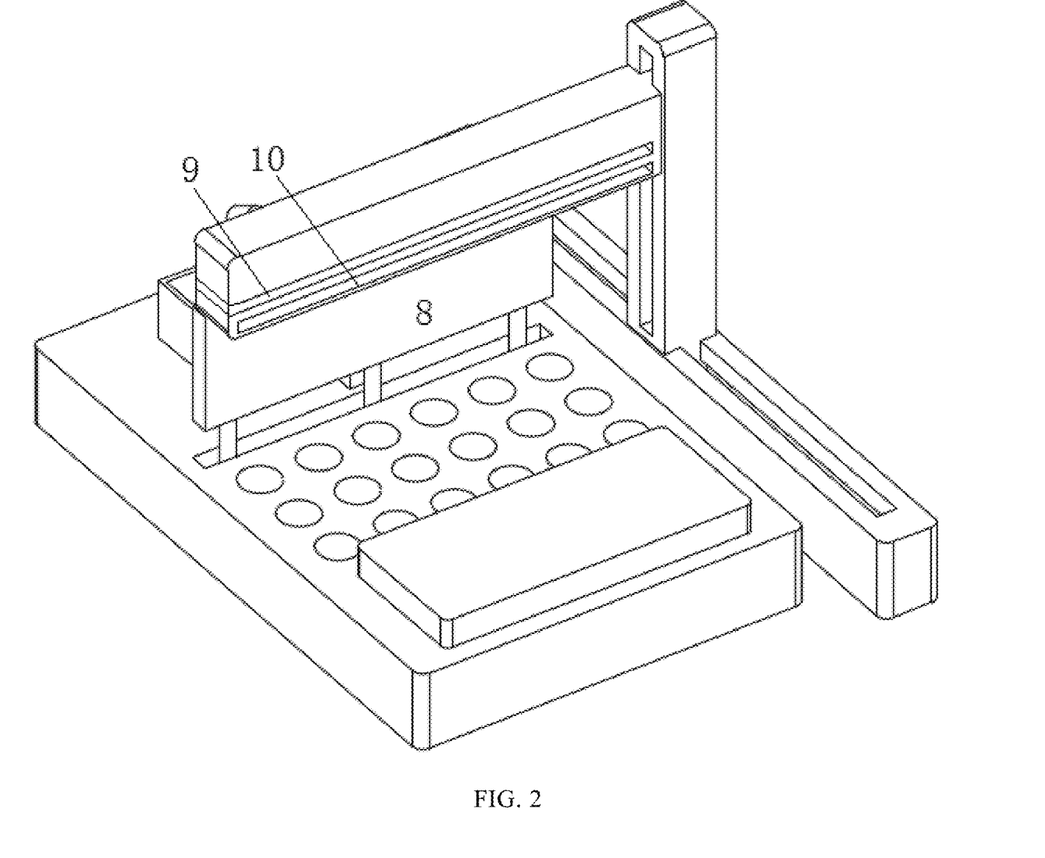
FIG. 2 is a structural schematic diagram (II) of the high-precision automatic weighing device for powder samples.

The present embodiment provides a high-precision automatic weighing device for powder samples. As shown in FIG. 1 to FIG. 6, the high-precision automatic weighing device includes a three-dimensional moving track and a working area 1, where the three-dimensional moving track includes a horizontal length track 2, a vertical track 3 and a horizontal width track 4, the vertical track 3 being slidingly connected to the horizontal length track 2, the horizontal width track 4 being slidingly connected to the vertical track 3, such that the horizontal width track 4 moves along the vertical track 3, and the vertical track 3 moves along the horizontal length track 2;

the horizontal length track 2 is arranged at an edge of one side of the working area 1, and a cleaning area 5, a sample storage area 6 and a weighing area 7 are provided in sequence along the horizontal length track 2 within the working area 1, and a liftable partition plate 8 is provided between the cleaning area 5 and the sample storage area 6, so as to avoid contamination to samples;

a first slideway 9 and a second slideway 10 are provided, wherein the first slideway is above the second slideway on one side, facing the weighing area 7, of the horizontal width track 4, and a third slideway 11 and a fourth slideway 12 are provided, wherein the third slideway is above the fourth slideway on the other side of the horizontal width track 4, the first slideway 9 extending to the other side of the horizontal width track 4 and being located below the fourth slideway 12, the first slideway 9, the second slideway 10, the third slideway 11 and the fourth slideway 12 being all horizontal; and the first slideway 9 is slidingly connected to a mechanical claw 13 for grabbing a sample tube 17 in the sample storage area 6, and the second slideway 10 is slidingly connected to a fine-tuning sample releasing mechanism 14 for tapping the sample tube 17 to release samples in trace amounts, and the third slideway 11 is slidingly connected to a sample head clamping part 15 for finishing the mounting or dismounting of a sample head 27 and the sample tube 17, and the fourth slideway 12 is slidingly connected to a sample loosening pestle for crushing agglomerated samples inside the sample tube 17.

In the present disclosure, through movement of the three-dimensional moving track above the working area 1, different work contents in the cleaning area 5, the sample storage area 6 and the weighing area 7 are realized, and further different samples are weighed automatically. The mechanical claw 13 grabs the sample tube 17 to be weighed within the sample storage area 6, the sample tube 17 having an opening on the top, and the sample tube 17 moves to the cleaning area 5 along the first slideway 9, and the sample head clamping part 15 of the third slideway 11 clamps the sample head 27 and mounts the sample head 27 on the opening of the sample tube 17. The sample tube 17 returns along the first slideway 9, and the vertical track 3 drives the horizontal width track 4 to move to the weighing area 7, and the mechanical claw 13 rotates the sample tube 17 to at least a horizontal state, and the fine-tuning sample releasing mechanism 14 gently taps front and back ends of the sample tube 17, and the powder samples are poured out in trace amounts from the sample head 27 into a sample containing container on an electronic scale. When the samples are agglomerated, the sample tube 17 returns to the cleaning area 5, and the sample head 27 is removed from the sample head clamping part 15, and the sample loosening pestle extends into the sample tube 17 and gently crushes the clumps to loosen the samples, and then the sample head 27 is remounted, and the sample tube 17 returns to the weighing area 7 to continue sample releasing and weighing.

Optionally, the working area 1 is rectangular, the horizontal length track 2 being arranged along a long side edge of the working area 1, the horizontal width track 4 being perpendicular to the horizontal length track 2, the vertical track 3 being perpendicular to a surface of the working area 1, such that parts connected onto each slideway can move their positions within a three-dimensional space of the corresponding working area 1.

Optionally, the sample storage area 6 includes a plurality of grooves arranged in a matrix, the grooves being configured to place the sample tubes 17; the weighing area 7 is provided with an electronic scale for weighing samples, as long as the weighing precision of the electronic scale meets the requirements of subsequent analytical experiments; and the partition plate 8 is inserted into a hollowed-out slot at a bottom plate of the working area 1, and a bottom of the partition plate 8 is connected to a lifting device for controlling the height by which the partition plate 8 extends out of the bottom plate of the working area 1, such that the partition plate 8 not only isolates the cleaning area 5 from the sample storage area 6 but also avoids obstructing movement of the horizontal width track 4.

Figure 3:
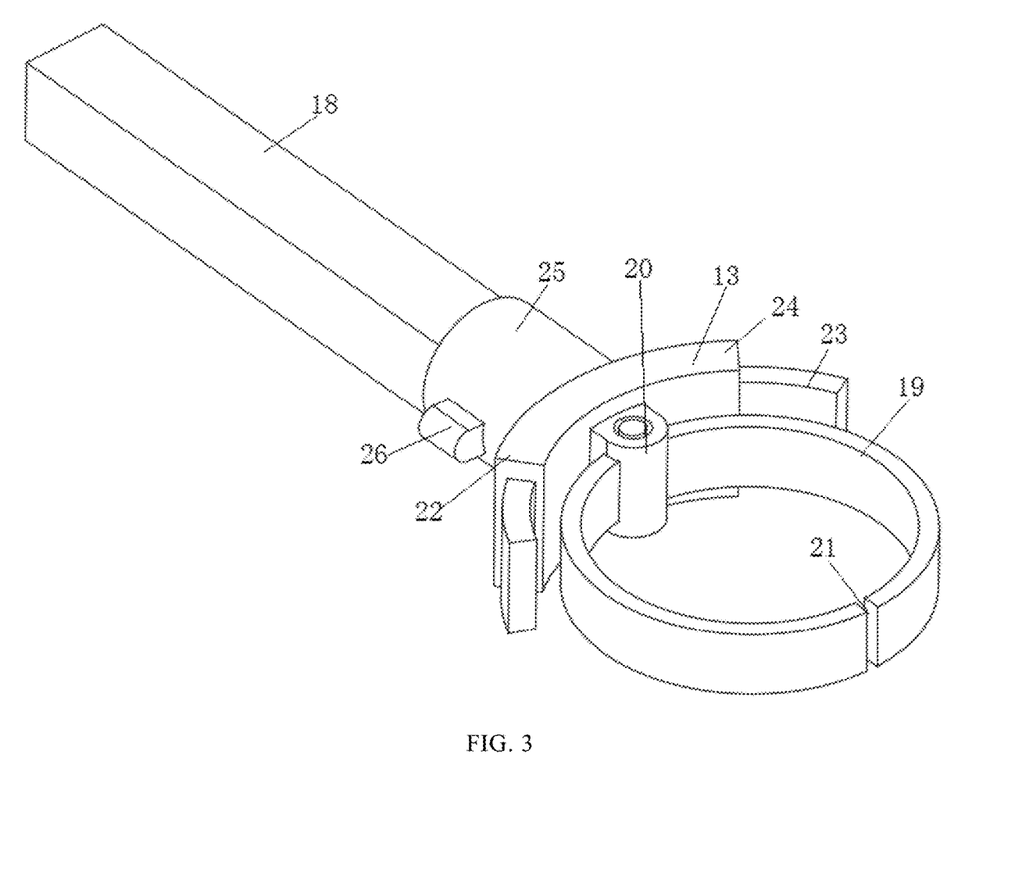
FIG. 3 is a structural schematic diagram of a mechanical claw.

Optionally, the mechanical claw 13 includes a supporting rod I 18 and a gripper 19 which is openable and closable, one end of the supporting rod I 18 being slidingly connected to the first slideway 9, the other end being rotationally connected to a closed end 20 of the gripper 19 through an adapter member 22; and the gripper 19 is circular, the gripper 19 being composed of two semicircular frames which are symmetrically arranged, and two corresponding ends on the same side of each of the two semicircular frames are connected in an articulated manner to form the closed end 20, and two corresponding ends on the other side can be opened and closed freely to form an opening and closing end 21; when a cylindrical sample tube 17 needs to be grabbed, the opening and closing end 21 of the gripper 19 is open, and the gripper 19 descends, such that a tube head of the sample tube 17 penetrates through the inside of the gripper 19, and then the opening and closing end 21 is closed, and the gripper 19 is tightly wrapped on an outer wall of the sample tube 17; and further optionally, the adapter member 22 is an arc-shaped retractable strip member, and the strip member consists of a fixed segment 24 and telescopic segments 23 on both sides, and the telescopic segments 23 can retract into and extend out of the fixed segment 24, one end of the supporting rod I 18 being rotationally connected to a middle part of an outer side of the fixed segment 24, an inner side of the strip member facing the gripper 19, one end, away from the fixed segment 24, of each of the two telescopic segments 23 being connected to an outer side surface of the corresponding semicircular frame, such that the gripper 19 drives, when the gripper 19 is open and closed, the two telescopic segments 23 to enter into and come out of the fixed segment 24, so that when the supporting rod 118 drives the gripper 19 to rotate, opening and closing of the gripper 19 will not be influenced.

Further optionally, a rotator 25 and an angle sensor 26 are provided at the position where the supporting rod 118 is connected to the adapter member 22, and the rotator 25 can control rotation of the gripper 19, and the angle sensor 26 can monitor in real time the rotation angle of the gripper 19, and further control the inclination angle of the sample tube 17. The rotator 25 and the angle sensor 26 both belong to the prior art, and the rotator 25 can be electromagnetically controlled and can rotate by 1° to the minimum each time. The rotator 25 and the angle sensor 26 are in communication connection with a control device external to the automatic weighing device.

Figure 4:
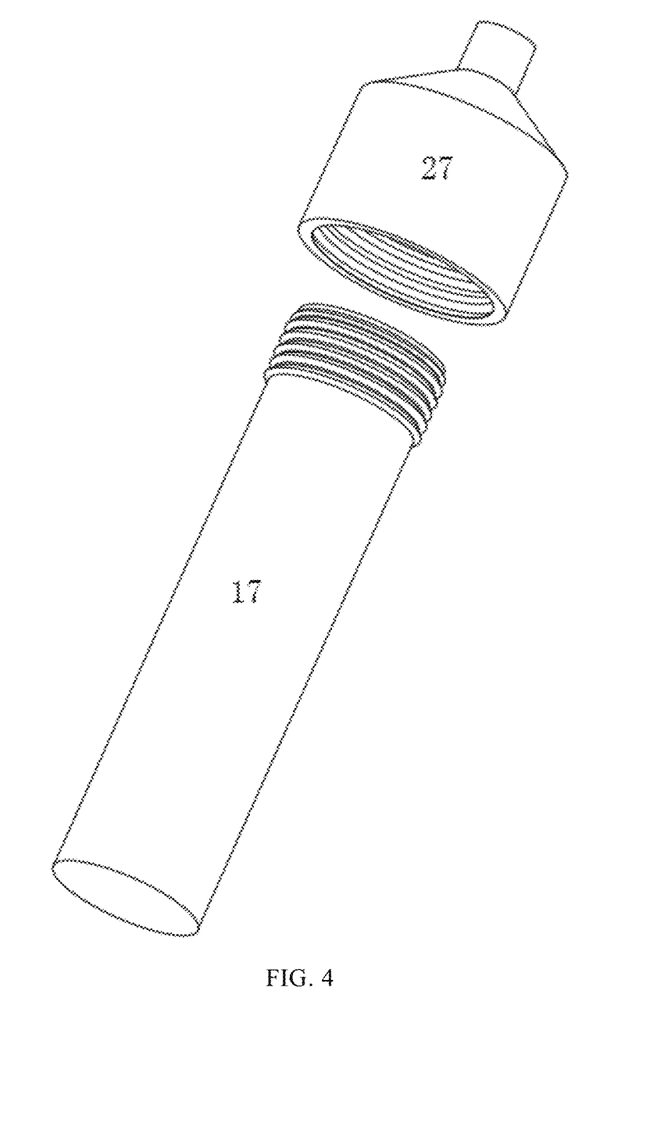
FIG. 4 is a schematic diagram of a sample head and a sample tube.

A circle of bayonets which protrude outward are generally provided at the position close to a pipe orifice on an outer wall of the sample tube 17, for example, a centrifugal tube;

when the gripper 19 grabs the sample tube 17, an upper surface of the gripper 19 abuts against a lower surface of the bayonet, and the bayonet serves to limit positions to avoid disengagement of the sample tube 17 from the gripper 19. An inner wall of the gripper 19 is provided with a silicone gasket, to better clamp the sample tube 17. The supporting rod 118 drives the gripper 19 to move above the working area 1 along the three-dimensional moving track. When the gripper 19 moves just above the required sample tube 17, the gripper 19 stays horizontal, and the opening and closing end 21 of the gripper 19 is open, and the vertical track 3 drives the mechanical claw 13 to descend, and the gripper 19 descends below the bayonet of the sample tube 17, and the gripper 19 is closed, and the upper part of the gripper 19 abuts against the bayonet of the sample tube 17, so that the mechanical claw 13 can drive the sample tube 17 to move. The sample tube may also be a crucible with threads on the top, or other containers capable of containing samples.

The opening and closing of the articulated position of the gripper 19 and the rotation of the adapter member 22 can be subjected to electromagnetic control, and the gripper 19 and the adapter member 22 are in communication connection with a control device external to the automatic weighing device.

Optionally, the sample head 27 is conical and is small at the top and large at the bottom with an opening at the top for pouring out samples, and the bottom is vertical and an inner wall is provided with internal threads to adapt to external threads on an outer wall on the top of the sample tube 17, so as to facilitate threaded connection between the sample head 27 and the sample tube 17; the sample head 27 is hollow inside and is provided with continuous spiral textures protruding inwards on the inner wall, and a plurality of circles of spiral textures are spirally provided from top to bottom along a circumferential direction of the sample head 27, the spiral textures extending from the top opening of the sample head 27 to the position above the bottom of the sample head 27, and the spiral textures are not connected to the above-mentioned internal threads. The diameter of the top opening of the sample head 27 is determined according to the requirements of weighing precision, e.g., 0.4-2 mm.

Conventional sample containing containers for weighing and releasing samples are generally completely open to facilitate pouring out samples, but also easily lead to pouring of more samples, causing an excessive weighed amount, and the extra samples cannot be poured back. Therefore, samples are wasted, and another sample containing container is needed to continue fine weighing, which is time-consuming and labor-intensive. In the present disclosure, a sample head 27 is additionally mounted at the opening of the sample tube 17; through threaded connection between the sample head 27 and the sample tube 17, samples are poured out from the top opening of the sample head 27, and a smaller amount of samples can be poured out each time, such that the weighing process is more easily controlled. The supporting rod I 18 controls rotation of the gripper 19 and the sample tube 17, such that the sample head 27 is tilted downwards in order to pour out samples. Since samples can only be poured out through the inner wall of the sample head 27, the powdered samples pass through the spiral textures inside the sample head 27, and at this time, in coordination with rotation of the sample tube 17 itself, the powder samples can move forwards spirally along the spiral textures, so the speed at which samples rush out of the sample tube 17 is greatly lowered, and sample discharge is slower and easier to control, and finally samples are poured out from the top opening of the sample head 27; moreover, the size of the top opening of the sample head 27 can be adjusted according to requirements of weighing precision, thereby further controlling the amount of discharged samples and improving the weighing precision.

Figure 5:
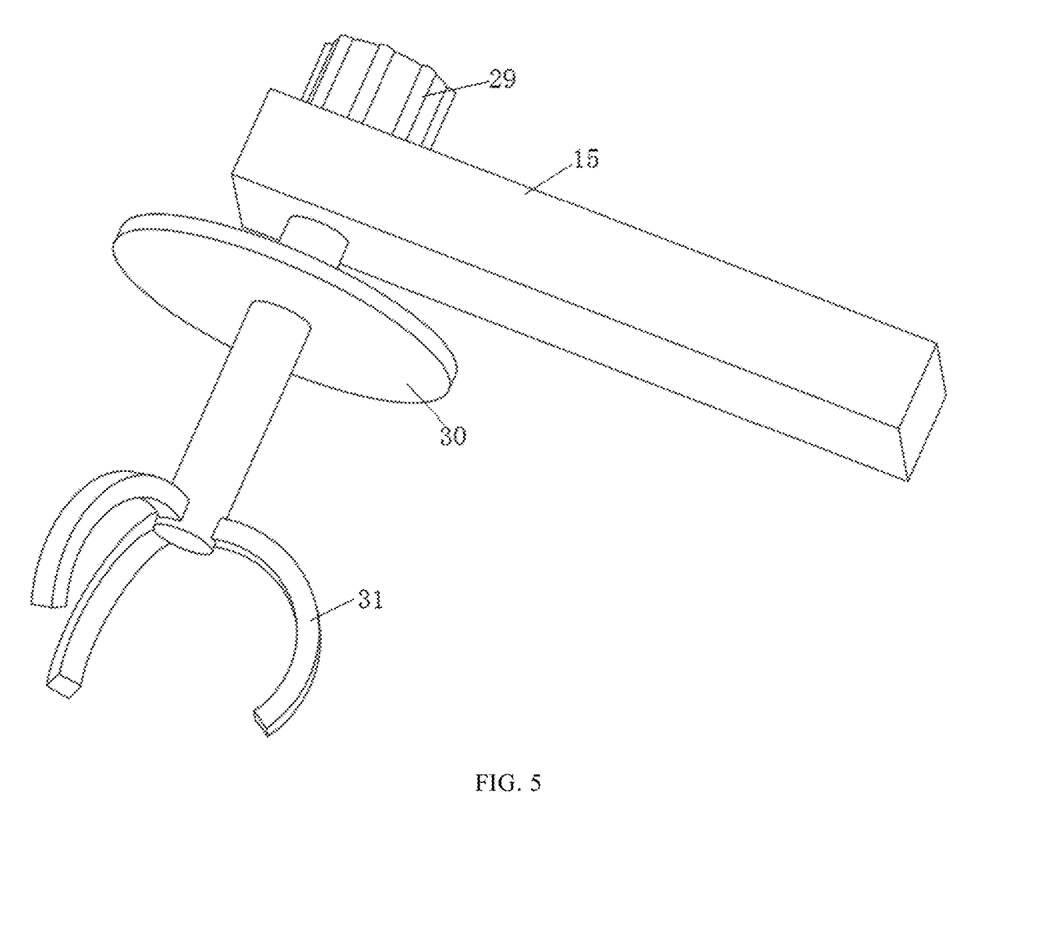
FIG. 5 is a schematic diagram of a sample head clamping part.

Optionally, the sample head clamping part 15 includes a rotating motor 29, a water baffling plate 30 and a holder 31 which are provided in sequence from top to bottom, where the rotating motor 29 is slidingly connected to the third slideway 11 through a sliding block, and a rotating shaft of the rotating motor 29 penetrates through the water baffling plate 30 and is connected to the holder 31, so as to drive the water baffling plate 30 and the holder 31 to rotate; and the water baffling plate 30 can prevent the water used for cleaning the sample head 27 from rushing to the rotating motor 29; and the holder 31 is a retractable and liftable three-claw holder 31, belonging to the prior art. In terms of holding position, the holder 31 includes two operating positions. The first operating position is a clamping position, i.e., the three claws are all close to the circle center of the holder 31, and at this time, inner walls of the three claws can be tightly pressed against the outer side surface at the bottom of the sample head 27, so that the sample head 27 is clamped; the second operating position is a relaxation position, i.e., the three claws are all far away from the circle center of the holder 31, and at this time, the three claws do not contact the sample head 27, so that the sample head 27 is not clamped; the top of the three claws is articulated with a telescopic rod, which is capable of moving the three claws up and down. The three-claw holder 31 is in communication connection with the control device in the form of electromagnetic control.

The sample heads 27 may be uniformly stored at the sample storage area 6, and the third slideway 11 extends to the other side of the horizontal width track 4 and is located above the first slideway 9. When in use, the vertical track 3 moves to a side of the sample storage area 6, and the sample head clamping part 15 moves above the first slideway 9 along the third slideway 11, and at this time, the sample head clamping part 15, the fine-tuning sample releasing mechanism 14 and the mechanical claw 13 are at the same side of the horizontal width track 4. When the holder 31 is in the second operating position, the telescopic rod of the holder 31 extends, and three claws of the holder 31 descend to the outside of the bottom of the sample head 27, and the holder 31 switches to the first operating position to clamp one clean sample head 27, and the telescopic rod retracts. The horizontal width track 4 descends along the vertical track 3, and the mechanical claw 13 grabs one sample tube 17 containing samples according to the above-mentioned method, and the holder 31 moves just above the sample tube 17 along the third slideway 11, and the telescopic rod extends, and the bottom of the sample head 27 is sleeved onto the top of the sample tube 17, and the rotating motor 29 rotates the holder 31 to tighten the sample head 27 onto the top of the sample tube 17.

When the sample head 27 needs to be cleaned, the above-mentioned operation is performed in reverse. The sample head 27 is unscrewed from the sample tube 17, and the sample head clamping part 15 moves along the third slideway 11 to the side, close to the cleaning area 5, of the horizontal width track 4, so as to clean the sample head 27.

Optionally, the cleaning area 5 includes a sink 32, a waterproof wall 33, a sprinkler 34 and at least two blow dryers 35, where the sink 32 is configured to reserve water for cleaning the sample head 27 and a sample loosening pestle, and the waterproof wall 33 is arranged around the sink 32 to prevent water sprayed onto the sample head 27 or the sample loosening pestle by the sprinkler 34 from splashing onto the outside of the sink 32;

the sprinkler 34 is inside the sink 32 and is provided with a water pump at the bottom and a nozzle at the top, and the water pump feeds water in the sink 32 into the sprinkler 34 and then sprays water out of the nozzle; and the two blow dryers 35 are symmetrically arranged on the outer side of the sink 32, and an air outlet is tilted upwards and aligned with the cleaned sample head 27 or sample loosening pestle above to dry the sample head 27 or the sample loosening pestle for use by the next sample tube 17. The sprinkler 34 and the blow dryer 35 belong to the prior art.

When the sample head 27 is cleaned, the sample head 27 clamped by the sample head clamping part 15 is directly above the sprinkler 34, and the bottom of the sample head 27 is facing downwards, and the telescopic rod can be extended appropriately to descend the sample head 27, and the sprinkler 34 sprays water upwards to rinse the inner wall of the sample head 27, and the waterproof wall 33 blocks water from spraying onto the rotating motor 29, and the water after washing falls back to the sink 32. When the sample head 27 is rinsed, the sample head 27 can be rotated, and water can flow along spiral textures inside the sample head 27, and rinses the residual samples inside the spiral textures, and under the action of a centrifugal force, the cleaning effect in the spiral textures is better. After the sample head 27 is washed, the rotating motor 29 rotates the water baffling plate 30 and the holder 31, and the sample head 27 rotates to throw out the water inside and outside, and then water falls into the sink 32. The sample head 27 rises, and the blow dryers 35 on both sides tilt upwards to blow air to the sample head 27, and the flowing air flows along the spiral textures, and then in coordination with rotation of the sample head 27, the air velocity of the flowing air inside the sample head 27 is effectively enhanced and drying is accelerated.

Figure 6:
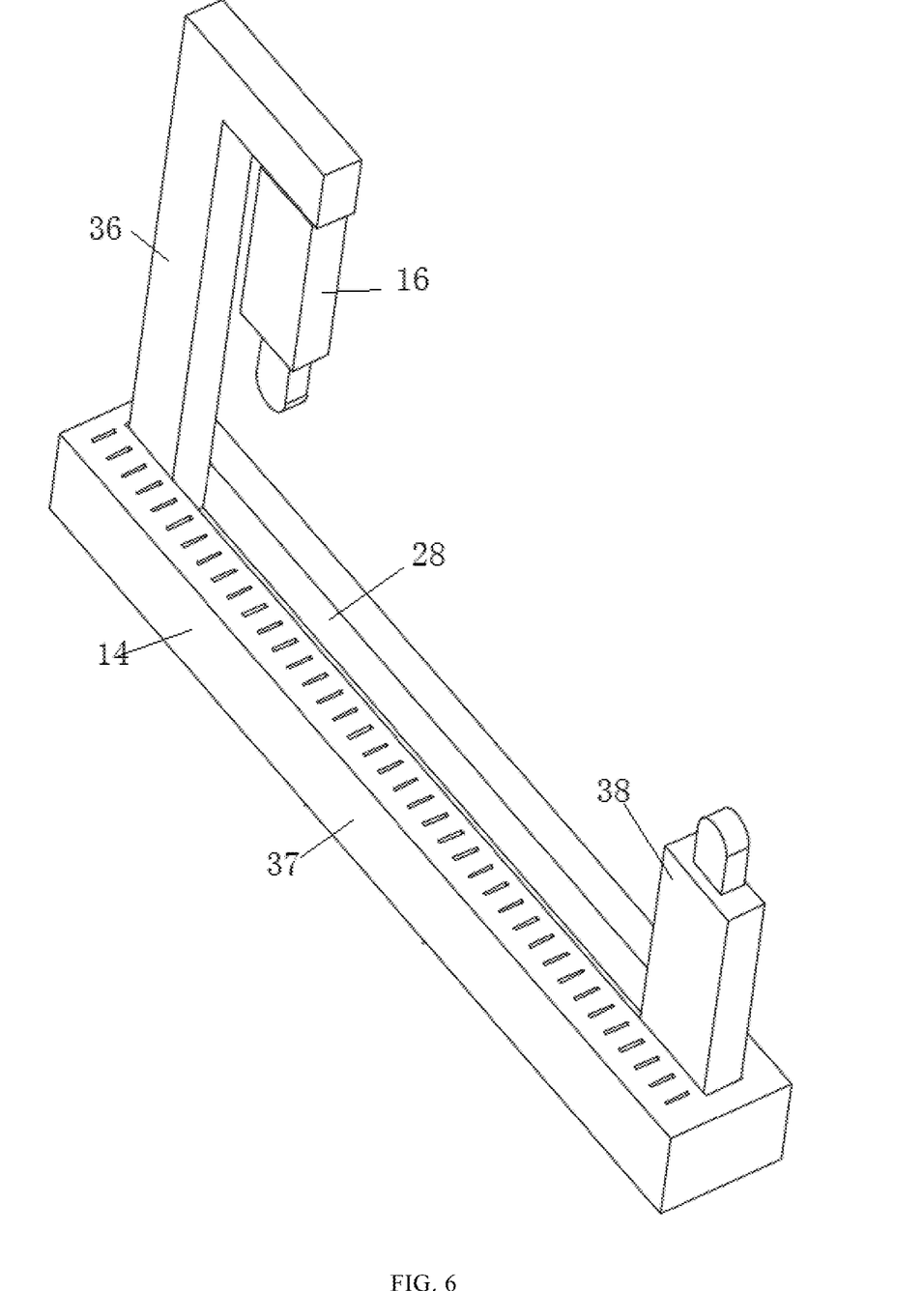
FIG. 6 is a schematic diagram of a fine-tuning sample releasing mechanism.

Optionally, the fine-tuning sample releasing mechanism 14 includes a supporting rod II, a balancing rod 37, an upward sample applicator 38 and a downward sample applicator 16, where one end of the supporting rod II is slidingly connected to the second slideway 10, and the other end is connected to the middle of the balancing rod 37; the balancing rod 37 is arranged horizontally, with one end being connected to a bottom of the upward sample applicator 38, while the other end being connected to the downward sample applicator 16 through a fulcrum rod 36; the upward sample applicator 38 and the fulcrum rod 36 are both arranged vertically, the bottom of the fulcrum rod 36 being connected to the balancing rod 37, the top being connected to the top of the downward sample applicator 16; and a retractable sample application head I is provided on the top of the upward sample applicator 38, and the sample application head I is configured to tap middle and lower parts of the sample tube 17, to promote samples inside the sample tube 17 to move outwards; a retractable sample application head II is provided on the bottom of the downward sample applicator 16, and the sample application head II is configured to tap the sample head 27, to promote samples in the sample head 27 to move outwards.

Further optionally, the balancing rod 37 is provided with scale lines on the upper or lower surface, the balancing rod 37 being provided with a hollowed-out chute 28, the chute 28 being parallel to the balancing rod 37, and the bottom of the upward sample applicator 38 and the bottom of the fulcrum rod 36 are both slidingly connected to the chute 28, such that the upward sample applicator 38 and the downward sample applicator 16 move their positions along the balancing rod 37, to tap different positions of the sample tube 17 and the sample head 27 to control the fall off of powder samples.

Further optionally, the upward sample applicator 38 and the downward sample applicator 16 can move along the chute 28 on the balancing rod 37 under the control of an electromagnetic device, and the movement distance is observed by means of the scale lines, such that the upward sample applicator 38 and the downward sample applicator 16 can act on different positions on the sample tube 17; and under the control of the electromagnetic device, the upward sample applicator 38 moves upwards at a constant force and frequency and taps the sample tube 17 and then retracts and resets; and under the control of the electromagnetic device, the downward sample applicator 16 moves downwards at a constant force and frequency and taps the sample head 27 and then retracts and resets. The electromagnetic device is in communication connection with the control device.

In the present disclosure, samples are released in trace amounts through coordination between the fine-tuning sample releasing mechanism 14 and the rotator 25 of the mechanical claw 13, to improve the weighing precision. Specifically, after the gripper 19 of the mechanical claw 13 grabs one sample tube 17, the sample head clamping part 15 tightens the sample head 27 onto the top of the sample tube 17, and a sample containing container is placed on an electronic scale, and the vertical track 3 moves above the sample containing container along the horizontal length track 2. The rotator 25 controls the gripper 19 and the sample tube 17 to rotate to a horizontal state of the sample tube 17, and the supporting rod II of the fine-tuning sample releasing mechanism 14 slides below the sample tube 17 along the second slideway 10, such that the upward sample applicator 38 is located below the tail part of the sample tube 17, and the downward sample applicator 16 is located above the sample head 27. When samples begin to be released, the rotator 25 controls the sample tube 17 to rotate by a certain angle, such that the samples can be poured out from the sample head 27, and at this time, the upward sample applicator 38 and the downward sample applicator 16 are located at two ends of the balancing rod 37, respectively, and the upward sample applicator 38 and the downward sample applicator 16 tap the sample tube 17 and the sample head 27, to promote the samples to be poured out. When a certain amount of samples are weighed and a small amount of samples need to be released each time, the rotator 25 controls the sample tube 17 to rotate by a smaller angle each time until the sample tube 17 only rotates by 1° each time, and the angle sensor 26 can monitor in real time the rotation angle. The upward sample applicator 38 and the downward sample applicator 16 are close to each other on the balancing rod 37, to tap different positions of the sample tube 17 and control the amount of discharged samples, such that only a very small amount of samples are poured out when the sample tube 17 is tapped each time, and the weighing precision is improved.

During the weighing process, if it is found that samples can no longer be poured out from the sample head 27, or the samples cannot be poured out smoothly, or if sample clumps are observed in the sample tube 17, sample release can be paused and a sample loosening pestle can be utilized to crush the sample clumps in the sample tube 17.

Optionally, the sample loosening pestle is telescopic, and the sample loosening pestle extends and retracts through electromagnetic control, such that the pestle head at the bottom can move up and down, and an electromagnetic controller corresponding to the top of the sample loosening pestle is slidingly connected to the fourth slideway 12 through a sliding block, and the electromagnetic controller is in communication connection with the control device. The pestle head may be conical which is large at the top and small at the bottom.

Before the sample loosening pestle is used, the fine-tuning sample releasing mechanism 14 is placed away from the sample tube 17, and the sample tube 17 is reset to a vertical state, and the vertical track 3 moves to the cleaning area 5, to avoid samples from overflowing or lifting out to the electronic scale when the samples are loosened. The mechanical claw 13 carrying the sample tube 17 moves to the side, close to the cleaning area 5, of the horizontal width track 4 along the first slideway 9, and the sample head clamping part 15 unscrews the sample head 27 and dismounts the sample head 27 from the sample tube 17, and at this time, the sample head 27 does not need to be cleaned. The sample loosening pestle moves just above the open sample tube 17 along the fourth slideway 12, and the sample loosening pestle moves downwards and extends into the sample tube 17, and the sample loosening pestle moves up and down repeatedly to crush the agglomerated samples in the sample tube 17. After the agglomerated samples are crushed, the sample loosening pestle is moved out and the sample head 27 is remounted to continue weighing. The sample loosening pestle moves above the sink 32, and the sample loosening pestle is cleaned and blown dry in the same manner as the sample head 27 for use in the next time. The distance by which the sample loosening pestle moves up and down can be adjusted by the control device, to avoid punching the bottom of the sample tube.

The control device can automatically control the three-dimensional moving track, the mechanical claw 13, the fine-tuning sample releasing mechanism 14, the sample head clamping part 15, the sample loosening pestle which are connected to each slideway, the sprinkler 34, the blow dryer 35 and the electronic scale, and this can be achieved in the prior art.

The invention claimed is:

1. A high-precision automatic weighing device for powder samples, comprising a three-dimensional moving track and a working area, wherein the three-dimensional moving track comprises a horizontal length track, a vertical track and a horizontal width track, the vertical track being slidingly connected to the horizontal length track, the horizontal width track being slidingly connected to the vertical track, such that the horizontal width track moves along the vertical track, and the vertical track moves along the horizontal length track;

the horizontal length track is arranged at an edge of one side of the working area, and a cleaning area, a sample storage area and a weighing area are provided in sequence along the horizontal length track within the working area;

a first slideway and a second slideway are provided, wherein the first slideway is above the second slideway on one side, facing the weighing area, of the horizontal width track, and a third slideway and a fourth slideway are provided, wherein the third slideway is above the fourth slideway on the other side of the horizontal width track, the first slideway extending to the other side of the horizontal width track and being located below the fourth slideway, the first slideway, the second slideway, the third slideway and the fourth slideway being all horizontal; and the first slideway is slidingly connected to a mechanical claw for grabbing a sample tube in the sample storage area, and the second slideway is slidingly connected to a fine-tuning sample releasing mechanism for tapping the sample tube to release samples in trace amounts, and the third slideway is slidingly connected to a sample head clamping part for finishing the mounting or dismounting of a sample head and the sample tube, and the fourth slideway is slidingly connected to a sample loosening pestle for crushing agglomerated samples inside the sample tube;

wherein the fine-tuning sample releasing mechanism comprises a supporting rod II, a balancing rod, an upward sample applicator and a downward sample applicator, wherein one end of the supporting rod II is slidingly connected to the second slideway, and the other end is connected to the middle of the balancing rod: the balancing rod is arranged horizontally, with one end being connected to a bottom of the upward sample applicator, while the other end being connected to the downward sample applicator through a fulcrum rod: the upward sample applicator and the fulcrum rod are both arranged vertically, the bottom of the fulcrum rod being connected to the balancing rod, the top being connected to the top of the downward sample applicator; and a retractable sample application head I is provided on the top of the upward sample applicator, and the sample application head I is configured to tap middle and lower parts of the sample tube, to promote samples inside the sample tube to move outwards: a retractable sample application head II is provided on the bottom of the downward sample applicator, and the sample application head II is configured to tap the sample head, to promote samples in the sample head to move outwards.

2. The high-precision automatic weighing device for powder samples according to claim 1, wherein the mechanical claw comprises a supporting rod I and a gripper which is openable and closable, one end of the supporting rod I being slidingly connected to the first slideway, the other end being rotationally connected to a closed end of the gripper through an adapter member; and the gripper is circular, the gripper being composed of two semi-circular frames which are symmetrically arranged, and two corresponding ends on the same side of each of the two semicircular frames are connected in an articulated manner to form the closed end, and two corresponding ends on the other side can be opened and closed freely to form an opening and closing end; when a cylindrical sample tube needs to be grabbed, the opening and closing end of the gripper is open, and the gripper descends, such that a tube head of the sample tube penetrates through the inside of the gripper, and then the opening and closing end is closed, and the gripper is tightly wrapped on an outer wall of the sample tube.

3. The high-precision automatic weighing device for powder samples according to claim 2, wherein a rotator and an angle sensor are provided at the position where the supporting rod I is connected to the adapter member, and the rotator can control rotation of the gripper, and the angle sensor can monitor in real time the rotation angle of the gripper, and further control the inclination angle of the sample tube.

4. The high-precision automatic weighing device for powder samples according to claim 1, wherein the sample head is conical and is small at the top and large at the bottom with an opening at the top for pouring out samples, and the bottom is vertical and an inner wall is provided with internal threads to adapt to external threads on an outer wall on the top of the sample tube, so as to facilitate threaded connection between the sample head and the sample tube; the sample head is hollow inside and is provided with continuous spiral textures protruding inwards on the inner wall, and a plurality of circles of spiral textures are spirally provided from top to bottom along a circumferential direction of the sample head, the spiral textures extending from the top opening of the sample head to the position above the bottom of the sample head, and the spiral textures are not connected to the above-mentioned internal threads.

5. The high-precision automatic weighing device for powder samples according to claim 1, wherein the sample head clamping part comprises a rotating motor, a water baffling plate and a holder which are provided in sequence from top to bottom, wherein the rotating motor is slidingly connected to the third slideway through a sliding block, and a rotating shaft of the rotating motor penetrates through the water baffling plate and is connected to the holder, so as to drive the water baffling plate and the holder to rotate; and the water baffling plate can prevent the water used for cleaning the sample head from rushing to the rotating motor; and the holder is a retractable and liftable three-claw holder; in terms of holding position, the holder comprises two operating positions; the first operating position is a clamping position in which the three claws are all close to the circle center of the holder, and at this time, inner walls of the three claws can be tightly pressed against the outer side surface at the bottom of the sample head, so that the sample head is clamped; the second operating position is a relaxation position in which the three claws are all far away from the circle center of the holder, and at this time, the three claws do not contact the sample head, so that the sample head is not clamped; the top of the three claws is articulated with a telescopic rod, which is capable of moving the three claws up and down.

6. The high-precision automatic weighing device for powder samples according to claim 1, wherein the cleaning area comprises a sink, a waterproof wall, a sprinkler and at least two blow dryers, wherein the sink is configured to reserve water for cleaning the sample head and a sample loosening pestle, and the waterproof wall is arranged around the sink to prevent water sprayed onto the sample head or the sample loosening pestle by the sprinkler from splashing onto the outside of the sink;

the sprinkler is inside the sink and is provided with a water pump at the bottom and a nozzle at the top, and the water pump feeds water in the sink into the sprinkler and then sprays water out of the nozzle; and the two blow dryers are symmetrically arranged on the outer side of the sink, and an air outlet is tilted upwards and aligned with the cleaned sample head or sample loosening pestle above to dry the sample head or the sample loosening pestle for use by the next sample tube.

7. The high-precision automatic weighing device for powder samples according to claim 1, wherein the balancing rod is provided with scale lines on the upper or lower surface, the balancing rod being provided with a hollowed-out chute, the chute being parallel to the balancing rod, and the bottom of the upward sample applicator and the bottom of the fulcrum rod are both slidingly connected to the chute, such that the upward sample applicator and the downward sample applicator both move their positions along the balancing rod, to tap different positions of the sample tube and the sample head to control the fall off of powder samples.

8. The high-precision automatic weighing device for powder samples according to claim 7, wherein the upward sample applicator and the downward sample applicator can move along the chute on the balancing rod under the control of an electromagnetic device, and the movement distance is observed by means of the scale lines, such that the upward sample applicator and the downward sample applicator can act on different positions on the sample tube; and under the control of the electromagnetic device, the upward sample applicator moves upwards at a constant force and frequency and taps the sample tube and then retracts and resets; and under the control of the electromagnetic device, the downward sample applicator moves downwards at a constant force and frequency and taps the sample head and then retracts and resets.

9. The high-precision automatic weighing device for powder samples according to claim 1, wherein the sample loosening pestle is telescopic, and the sample loosening pestle extends and retracts through electromagnetic control, such that the pestle head at the bottom can move up and down, and an electromagnetic controller corresponding to the top of the sample loosening pestle is slidingly connected to the fourth slideway through a sliding block.

* * * * *